United States Patent [19]

Derx

[11] Patent Number: 5,683,495

[45] Date of Patent: Nov. 4, 1997

[54] DEVICE FOR THE FILTRATION OF A FLOW OF AIR, IN PARTICULAR FOR THE HEATING AND/OR AIR CONDITIONING PLANT IN A MOTOR VEHICLE

[75] Inventor: Siegfried Derx, Lichtenfels, Germany

[73] Assignee: Rodacher Autoklima GmbH, Rodach, Germany

[21] Appl. No.: 563,705

[22] Filed: Nov. 28, 1995

[30] Foreign Application Priority Data

Dec. 1, 1994 [DE] Germany .................. 44 42 851.0

[51] Int. Cl.⁶ .................. B01D 53/00; B01D 50/00
[52] U.S. Cl. .................. 96/134; 55/309; 55/328; 55/422; 55/478; 55/482; 96/136; 454/158
[58] Field of Search .................. 55/422, 328, 478, 55/482, 309, 312; 96/134, 139, 142, 136, 125; 95/113, 286; 454/158

[56] References Cited

U.S. PATENT DOCUMENTS

| 830,592 | 9/1906 | Holdaway et al. ............... 55/422 |
| 3,086,342 | 4/1963 | Goettl ............................. 55/422 |
| 4,671,810 | 6/1987 | Dietzsch et al. ................ 55/309 |
| 5,050,487 | 9/1991 | Arold et al. .................... 55/312 |
| 5,085,266 | 2/1992 | Arold et al. .................... 165/1 |
| 5,147,428 | 9/1992 | Elliot ............................ 55/309 |
| 5,254,033 | 10/1993 | Brauen et al. ................. 55/309 |

FOREIGN PATENT DOCUMENTS

| 183 937 | 6/1986 | European Pat. Off. . |
| 750502 | 8/1933 | France .......................... 55/422 |
| 3643478 | 7/1988 | Germany ....................... 454/158 |
| 37 27 672 C1 | 7/1988 | Germany . |
| 3706220 | 9/1988 | Germany ....................... 454/158 |
| 3737010 | 5/1989 | Germany ....................... 454/158 |
| 41 23 448 A1 | 1/1992 | Germany . |

Primary Examiner—Jay H. Woo
Assistant Examiner—Duane S. Smith
Attorney, Agent, or Firm—Morgan & Finnegan, L.L.P.

[57] ABSTRACT

A device for the filtration of an airstream, in particular for a heating and/or air conditioning installation in a motor vehicle. The device provides, on one hand, a filtration that includes as much as possible of the entire airstream, while, on the other hand, for cooling and/or heating purposes, the device provides the entire air-conveying capacity without any air-output losses due to the filtration. The device includes a first outer air-channel containing fixed filter-wall parts of an activated carbon-filter arrangement, and a second inner air-channel containing second filter-wall parts of a particle-filter arrangement. The second filter-wall parts can be pivoted between an opening position which is essentially parallel to the first filter-wall parts and a closure position. Also included is a closure device at the exit of the outer air-channel, such that in the closure position, the entire airstream is conveyed at least through the filter-wall parts.

11 Claims, 3 Drawing Sheets

5,683,495

DEVICE FOR THE FILTRATION OF A FLOW OF AIR, IN PARTICULAR FOR THE HEATING AND/OR AIR CONDITIONING PLANT IN A MOTOR VEHICLE

FIELD OF THE INVENTION

The invention refers to a device for the filtration of a stream of air, in particular for a heating and/or air conditioning installation in a motor vehicle.

BACKGROUND OF THE INVENTION

From DE-A1-41 23 448 there is known a device for the filtration of a stream of air, in particular for a motor vehicle, in which two plate-shaped filter parts are capable, by means of a pivoting suspension at one of their ends, of being pivoted into a V-shaped active position and are then capable of being pivoted back from the latter position into a position which is parallel with their outer side to the internal wall of the housing which accommodates the device; in a manner such that the airstream can flow through directly between the internal walls of the filter plates.

SUMMARY OF THE INVENTION

The present invention includes a device for the filtration of an airstream—in particular in the case of a heating and/or air conditioning installation of a motor vehicle—which device, while being simple to adjust, makes it possible, on one hand, to effect a complete filtration of the air conveyed into the vehicle, while on the other hand to supply for a short time the entire airstream without flow losses and without any losses in air output capacity due to the flow resistances of the filter devices for the purpose of maximum cooling and/or heating.

The device according to the invention permits, with a compact mode of construction and simple adjustments, on one hand a complete filtration by means of a first air-channel of an activated-carbon filter arrangement, and of a second air-channel of a particle-filter arrangement; whereas, on the other hand, it is possible by merely actuating a closure arrangement and/or by pivoting of the filter-wall parts of one of the arrangements, either to activate only one of the filter arrangements (and thereby considerably reduce the flow resistance), or else to allow the airstream free flow without any forced conveyance through either of the filter arrangements. In the latter case, a small proportion of the airstream simultaneously flows through these filters and thereby counteracts the deposition of any kind of dirt onto the filter walls which had been taken out of their active position.

Preferably, the air channels are made up, respectively, of plate-shaped first filter-wall parts and/or pivotable second filter-wall parts (which are easily exchanged), and lateral wall parts of the housing that accommodates the device, which lateral wall parts lie between the filter-wall parts.

The pivotable second filter-wall parts are advantageously arranged in a manner such that even if they are opened—i.e., if placed in the inactive position—the airstream flows through the second filter-wall parts, so that particles are filtered out of the airstream before they can enter the active-filter arrangement. On the other hand,—by opening a closure direction and by pivoting the second filter-wall parts into their active position the airstream, with low flow losses, flows only through the particle-filter arrangement.

BRIEF DESCRIPTION OF THE DRAWINGS

The invention, as well as further advantageous embodiments of the invention, are explained in greater detail below, on the basis of examples of embodiment schematically represented in the drawings. The drawings show the following.

DESCRIPTION OF THE PREFERRED EMBODIMENTS

Figure 1:
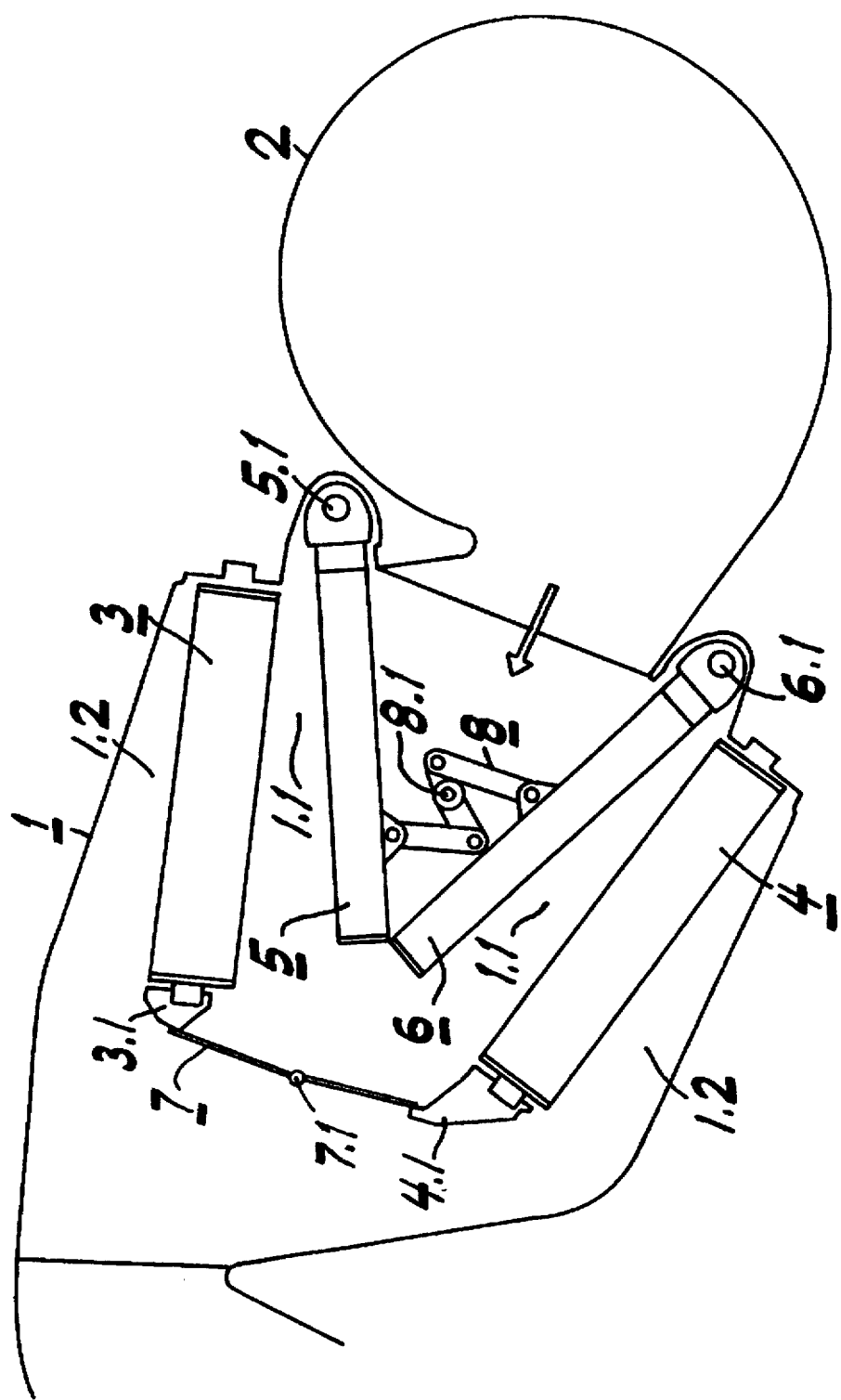
FIG. 1: In a longitudinal section, a first device with an active activated-carbon filter device and an active particle-filter device.
Figure 2:
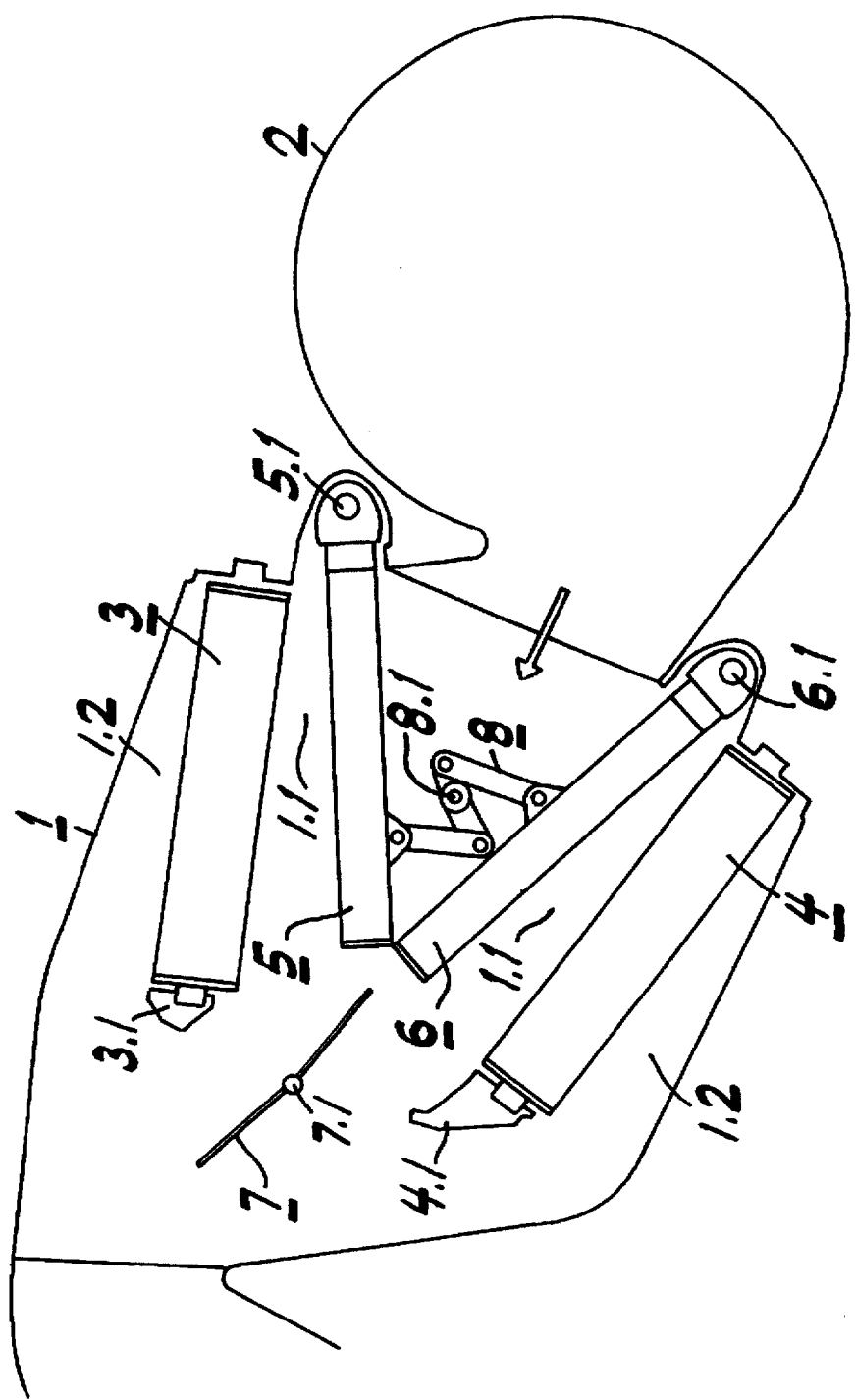
FIG. 2: The arrangement according to FIG. 1, with only the particle-filter arrangement being active.
Figure 3:
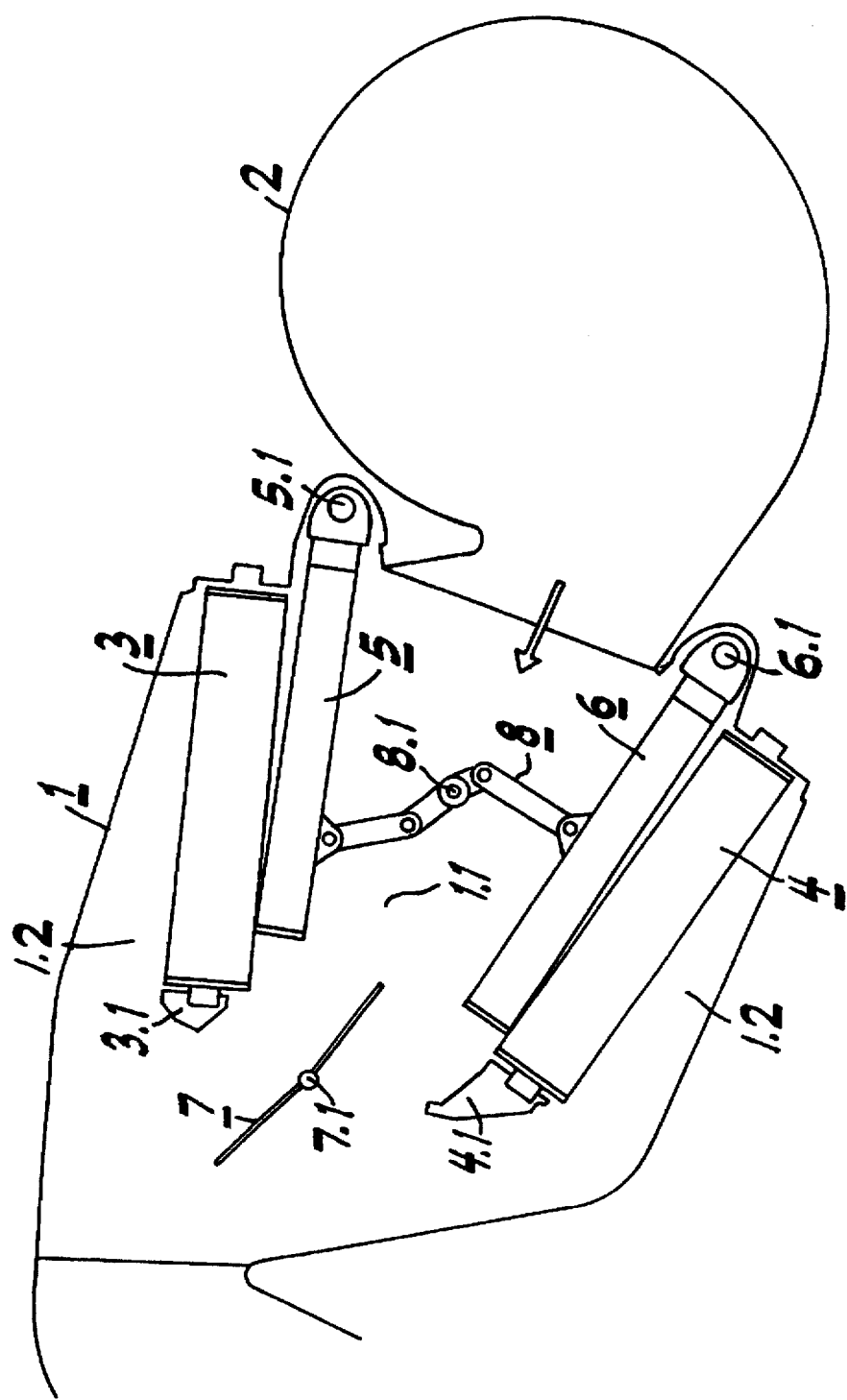
FIG. 3: The arrangement according to FIG. 1, with both the activated-carbon filter arrangement and the particle-filter arrangement being inactive.

FIGS. 1–3 show, in a schematic longitudinal section, the housing 1 of a heating and/or air conditioning installation, with a fan housing 2 on the side of the flow inlet, such as may be used, for instance, in a heating and/or air conditioning installation in a motor vehicle. For the filtration of the stream of air, conveyed from the fan housing 2 in accordance with the flow arrow shown in the drawing, there are provided an outer activated-carbon filter arrangement with easily-exchangeable plate-shaped filter-wall parts 3, 4, and an inner particle-filter arrangement, also with easily-exchangeable plate-shaped filter-wall parts 5, 6. The filter-wall parts 3, 4 of the activated carbon-filter arrangement are rigidly built in to the housing 1. The filter-wall parts 5, 6 of the particle-filter arrangement are supported in a manner that is pivotable around swivel bearings 5.1, 6.1 in the vicinity of those ends of the filter-wall parts 3, 4 which are on the side of the air inlets of the activated carbon-filter arrangement. The filter-wall parts 5, 6 are also capable of being pivoted back— via a toggle arrangement 8 which is pivotable around a swivel bearing 8.1—from an active position (in accordance with FIG. 1 and/or FIG. 2) into an inactive position (in accordance with FIG. 3), so that they run in an essentially parallel direction to the inlet side of the filter-wall parts 3, 4 of the activated carbon-filter arrangement, in which case they cover the major part of the activated-carbon filter's inlet side. In this manner one ensures that, even in the open position of the particle-filter arrangement, at least the major proportion of the air entering the filter-wall parts 3, 4 of the activated carbon-filter arrangement will flow through the filter-wall parts 5, 6 of the particle-filter arrangement.

The change from, on one hand, an inactive position of the filter-wall parts 3, 4 of the activated carbon-filter arrangement to, on the other hand, an active position is achieved in a simple manner by means of a closure device on the exit side of the activated carbon-filter arrangement. The closure device takes the shape of a closure flap 7 which can be pivoted around a swivel bearing 7.1, the closure flap being shown in FIG. 1 in its closure position (abutting on its end side against stops 3.1, 4.1 of the first filter-wall parts 3, 4), and being shown in FIG. 2 and FIG. 3 in its opening position. In the closure position according to FIG. 1, the entire airstream entering from the fan housing 2 passes through the filter-wall parts 3;4 of the activated carbon-filter arrangement. In the opening position of the closure flap 7, according to FIG. 2, after at least a major proportion of the entire airstream has passed in forced flow through the filter-wall parts 5, 6 of the particle-filter arrangement, (which filter-wall parts 5, 6 had been pivoted into the active position), the major part of the airstream can flow out directly, without being forced to flow through the filter-wall parts 3, 4 of the activated carbon-filter arrangement.

In the embodiment of the invention shown in FIG. 3, at least a major proportion of the airstream entering from the fan housing 2 can also flow, without flow resistance, directly through the particle-filter arrangement. However, a part of the air entering from the fan housing 2 can pass both through the open filter-wall parts 5, 6 of the particle-filter arrangement and through the downstream filter-wall parts 3, 4 of the activated carbon-filter arrangement. This is particularly true if, as shown, the filter-wall parts 3, 4 are arranged in a V-shape like a nozzle and the filter-wall parts 5, 6 of the particle-filter arrangement are parallel to the filter-wall parts 3, 4.

In accordance with an embodiment of the invention, the inner air-channel and/or the outer air-channel, respectively, is made up by the two filter-wall parts 3, 4 and/or 5, 6, and the wall parts 1.1 of the housing 1 which, at least in their end positions, are tightly connected to the filter-wall parts 3, 4 and/or 5, 6. The filter-wall parts 3, 4 of the activated carbon-filter arrangement are built into housing 1 in a manner such that, above the filter-wall parts 3, 4 and on the latter's exit sides, there are formed air-exhaust channels 1.2, which air-exhaust channels 1.2 preferably expand and/or converge in a nozzle fashion, in response to the airstream buildup.

I claim:

1. A device for the filtration of an airstream, comprising an outer air channel having fixed first filter-wall parts of an activated carbon-filter arrangement; an inner air-channel enveloped by the outer air-channel, said inner air-channel having second filter-wall parts pivotable between an opening position substantially parallel to the first filter-wall parts and a closure position; and a closure device at an exit of the outer air channel, said closure device being moveable between an opening position and a closure position wherein when said closure device is in said closure position an entirety of the airstream is conveyed through the first filter-wall parts.

2. A device according to claim 1, wherein the outer air-channel is formed by connecting lateral wall-parts of a housing to the first filter-wall parts and wherein the inner air-channel is formed by connecting said lateral wall parts to the second filter-wall parts.

3. A device according to claim 1, wherein when said second filter-wall parts are pivoted to said closure position, an entirety of the airstream is conveyed through the second filter-wall parts to the outer air-channel.

4. A device according to claim 1, wherein when said second filter-wall parts are pivoted to said opening positoin a major proportion of a portion of the airstream that flows through the first filter-wall parts also flows through the second filter-wall parts.

5. A device according to claim 1, wherein said second filter-wall parts are pivotable on swivel bearings arranged in a region of an inflow side of the airstream into the outer air-channel and the inner air-channel.

6. A device according to claim 1, wherein the first filter-wall parts and the second filter-wall parts are arranged in a V-shape.

7. A device according to claim 1, further comprising an air exhaust channel which envelopes the outer air-channel.

8. A device according to claim 1, wherein the airstream flows into the outer air-channel and the inner air-channel at an end of the outer air-channel and an end of the inner air-channel which are oriented away from the exit of the outer air channel.

9. A device according to claim 1, wherein said closure device is a closure flap pivotable around an axis between said closure position and said opening position.

10. A device according to claim 1, wherein said inner air-channel can be closed at an exit of said inner air channel by pivoting said second filter-wall parts, said exit of said inner air-channel being adjacent said exit of said outer air-channel.

11. A device according to claim 1, wherein said first filter-wall parts and said second filter-wall parts are plate-shaped and exchangeable.

* * * * *